United States Patent [19]
Kobayashi et al.

[11] Patent Number: 5,670,767
[45] Date of Patent: Sep. 23, 1997

[54] GAS-INSULATED SWITCHGEAR WITH IMPROVED INSULATION JOINT

[75] Inventors: Masatomo Kobayashi; Hiromichi Hokuto, both of Hitachi; Yoichi Ohshita, Hitachinaka; Minoru Sakaguchi, Hitachi, all of Japan

[73] Assignee: Hitachi, Ltd., Tokyo, Japan

[21] Appl. No.: 518,315

[22] Filed: Aug. 23, 1995

[30] Foreign Application Priority Data

Aug. 30, 1994 [JP] Japan .................... 6-204845

[51] Int. Cl.⁶ .................... H01H 33/00; H02B 13/045
[52] U.S. Cl. .................... 218/43; 218/68; 218/3; 361/604
[58] Field of Search .................... 218/43, 79, 80, 218/44, 45, 55, 68, 82; 361/604, 612, 618, 624

[56] References Cited

U.S. PATENT DOCUMENTS

| | | | |
|---|---|---|---|
| 3,767,976 | 10/1973 | Graybill et al. | 218/45 X |
| 3,959,577 | 5/1976 | Frink | 218/68 X |
| 4,277,746 | 7/1981 | Abe et al. | 174/11 R X |
| 4,468,716 | 8/1984 | Kamata et al. | 361/604 |

FOREIGN PATENT DOCUMENTS 1-278210  11/1989  Japan .................... H01H 33/64

OTHER PUBLICATIONS

Patent Abstracts of Japan, Unexamined Applications, Section: E, Sect. No. 881, vol. 14, No.51, p. 146 (19900130): source for enclosed one page document including abstract for JP 01–278210.
14, No.51, p. 146 (19900130): source for the above mentioned Japio abstract for JP 01–278210.

*Primary Examiner*—J. R. Scott
*Attorney, Agent, or Firm*—Fay, Sharpe, Beall, Fagan, Minnich & McKee

[57] ABSTRACT

A gas-insulated switchgear in which a washer 5 is electrically connected with a tank 1 by a conductive material 12 having a high resistivity at a position where the tank 1 and a tank 2 are joined through an insulator 13 of the gas-insulated switchgear. In view of the structure of the switchgear, the reliability is improved, the structure is simplified, the number of parts is decreased, and the profitability is improved because a steep surge is not theoretically induced for a steep surge induced when turning on/off each unit at an electrically insulated position of a joint between tanks through an insulator of a gas-insulated switchgear for an $SF_6$ gas-insulated closed-type station.

4 Claims, 4 Drawing Sheets

GAS-INSULATED SWITCHGEAR WITH IMPROVED INSULATION JOINT

BACKGROUND OF THE INVENTION

The present invention relates to an insulating joint between tanks of a gas-insulated switchgear for an $SF_6$ gas-insulated closed-type station.

FIG. 5 shows a prior art joint between two tanks of a general gas-insulated switchgear. In FIG. 5, a tank 1 and a tank 2 are connected to each other through an insulated mounting section 3. In the gas-insulated switchgear, an induced current of 50 or 60 Hz equal to an operating frequency normally flows through the tanks in accordance with a current flowing through a main circuit conductor 4. When a circuit breaker and a grounding switch are turned on while the main circuit is charged or at the time of restriking when the circuit breaker is turned on/off, switching surge progresses through the main circuit conductor 4. In this case, a potential fluctuation with a frequency of several to several tens of megahertz occurs in the tanks 1 and 2 serving as part of a return circuit of the surge or part of a discharge route of charged electric charges. Because the potential fluctuation may have a voltage equal to or higher than the dielectric strength of the insulated mounting section 3, an arc occurs along the air contacting surface of the insulated mounting section 3.

FIG. 6 shows an enlarged view of the insulated mounting section 3 of FIG. 5. In FIG. 6, the tanks 1 and 2 are connected with each other by a stud bolt 14, a washer 5, and a nut 6 through an insulator member 13. Moreover, the tanks are electrically interconnected by a bond strap 7 which is a metallic conductor. Furthermore, an insulating washer 9 and and insulating gap 10 are provided so that the current flowing through the tanks under normal operation does not flow through a metallic section 8 integral with the insulator 13. This is because, if the above current flows through the metallic section 8, the temperature of rises and the section 8 causes thermal breakdown due to a difference of expansion coefficient between the section 8 and the insulator 13.

In the case of the structure shown in FIG. 6, however, when a steep surge is induced when turning on/off each unit of the tanks, current flows through the bond strap 7 at the joint between both tanks and a potential difference equivalent to a voltage drop due to a surge impedance of the bond strap 7 occurs between the tanks 1 and 2. In this case, the potential of the stud bolt 14 structurally becomes equal to that of the tank 2, a voltage equivalent to the potential difference between the tanks 1 and 2 is applied to the insulating washer 9, and dielectric breakdown occurs on the air contacting surface of the insulating washer 9 which is the weakest portion when a breakdown occurs. To prevent a dielectric breakdown, structure shown in FIG. 7 is used.

In FIG. 7, the both tanks are electrically interconnected by a zinc oxide device 11 serving as a surge bypass circuit in a manner differently from FIG. 6. Because the zinc oxide device 11 has a nonlinear resistance characteristic, it is possible to keep the voltage at both ends of the device below a certain value. Therefore, by using the structure in FIG. 7, it is possible to keep the potential difference between both tanks, that is, the voltage applied to the insulating washer 9, below a certain value and prevent dielectric breakdown on the air contacting surface of the insulating washer 9.

The above generally-known example has a disadvantage that the manufacturing man-hours and the number of parts increases because a zinc oxide device is used and the size of the insulated section increases in order to insulate the tank current that constantly flows and secure the withstand voltage for a steep surge induced when turning on/off each unit. Objects of the present invention are to improve the reliability by theoretically preventing a steep surge from being induced at an insulated section and improve the profitability by simplifying the structure and decreasing the number of parts.

SUMMARY OF THE INVENTION

To achieve the objects of the present invention, the first feature of the present invention lies in a gas-insulated switchgear in which portions of tanks connected through an insulator are electrically interconnected by a second conductor member having a resistivity (approx. 10 $\Omega$) higher than that of a metallic first conductor member which electrically connects the tanks.

The second feature of the present invention lies in a gas-insulated switchgear in which tanks are electrically interconnected by using a conductive material having a resistivity (approx. 10 $\Omega$) higher than that of a metallic conductor for electrically connecting the tank for part of an insulator for insulating the joint between the tanks.

Because the above conductive material has a resistivity higher than that of the metallic conductor for electrically connecting the tanks, most of the current normally flowing through the tanks flows through the metallic conductor. Therefore, negligible heat is generated by the current flowing through a metallic section integrated with an insulator. For a steep surge, because the surge impedance of the conductor for electrically connecting the tanks is as large as on the order of several hundred ohms, a surge current flows through the tanks via the conductive material and therefore, the potential difference between the tanks is limited to a range in which there is no problem with respect to the withstand voltage of the insulator.

Therefore, it is possible to prevent thermal breakdown of an insulator due to the normal tank current, secure a withstand voltage against a steep surge, simplify the structure, and decrease the number of parts without using a zinc oxide device as before.

Moreover, a conductive material has the same characteristic as the above. Therefore, the same function as the above is obtained by using a conductive material with a high resistivity for part of a material for insulating a joint between tanks.

Therefore, it is possible to prevent thermal breakdown of an insulator due to the normal tank current, secure a withstand voltage against a steep surge, simplify the structure, and decrease the number of parts without using a zinc oxide device as before.

DETAILED DESCRIPTION OF THE PREFERRED EMBODIMENTS

Figure 1:
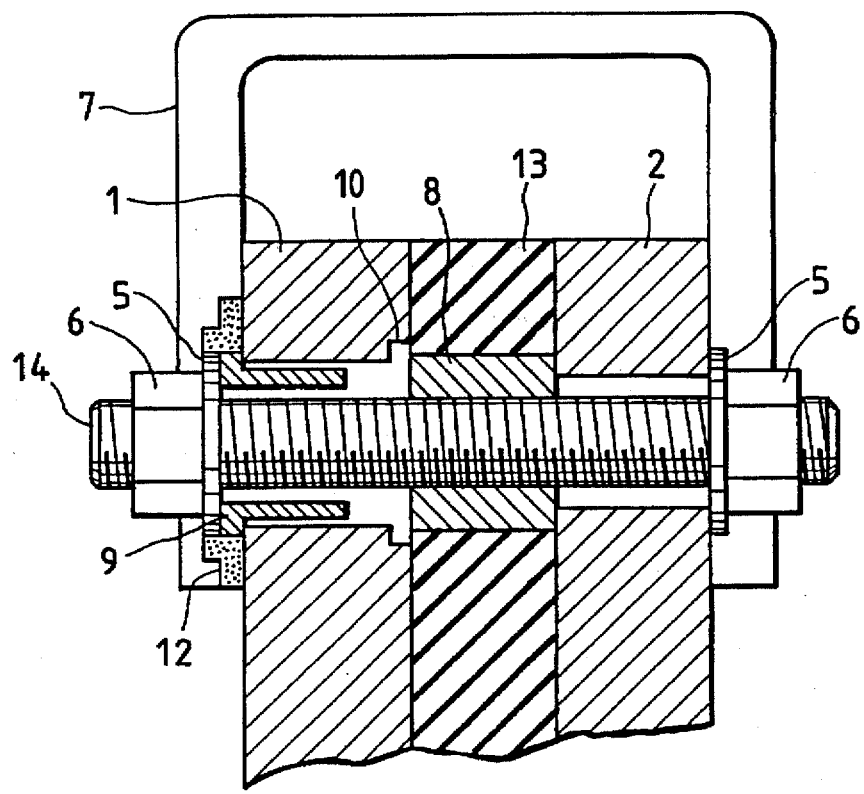
FIG. 1 shows an embodiment of the present invention.

FIG. 1 shows an embodiment of the present invention. In FIG. 1, the washer 5 is electrically connected with the tank 1 through a conductive material 12 with a high resistivity.

According to this embodiment, most of the current normally conducted through the tank flows through the bond strap or first conductor member 7 having a resistivity lower than that of the conductive material or second conductor member 12, and negligible heat is generated by the current flows through the metallic section 8. Therefore, thermal breakdown due to a temperature rise is prevented. Moreover, for a steep surge, breakdown due to the steep surge does not occur in each insulated section because the bond strap 7 has a large surge impedance and thereby, current flows through both tanks via the conductive material 12 and the potential difference between the tanks is limited. That is, the reliability is improved because a steep surge is not theoretically induced in an insulated section. Moreover, because the zinc oxide device 11 used for the existing structure shown in FIG. 6 is unnecessary, the structure is simplified and the number of parts can be decreased.

Figure 2:
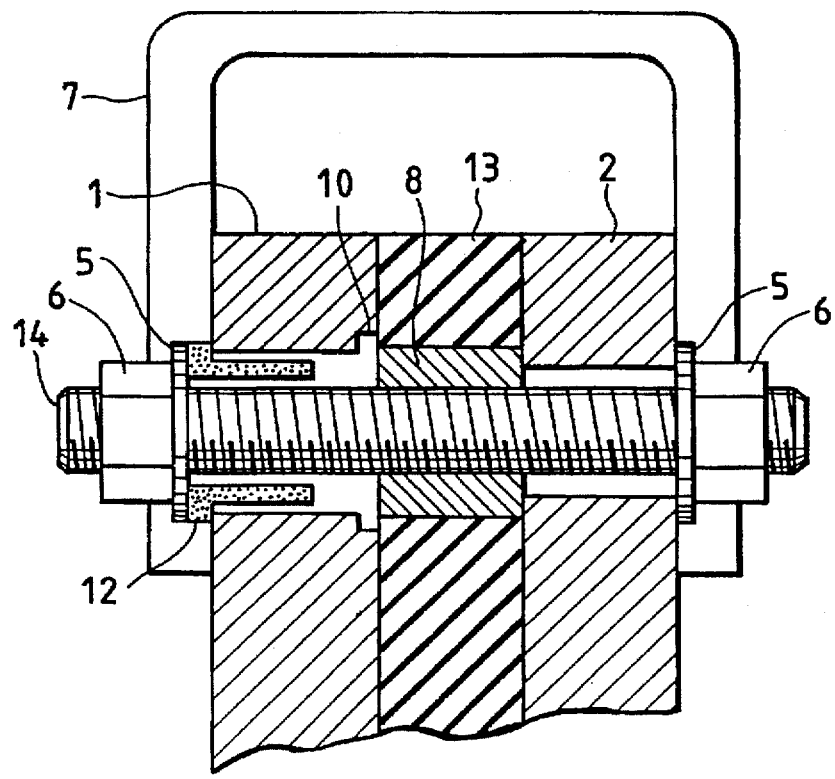
FIG. 2 shows another embodiment of the present invention.
Figure 3:
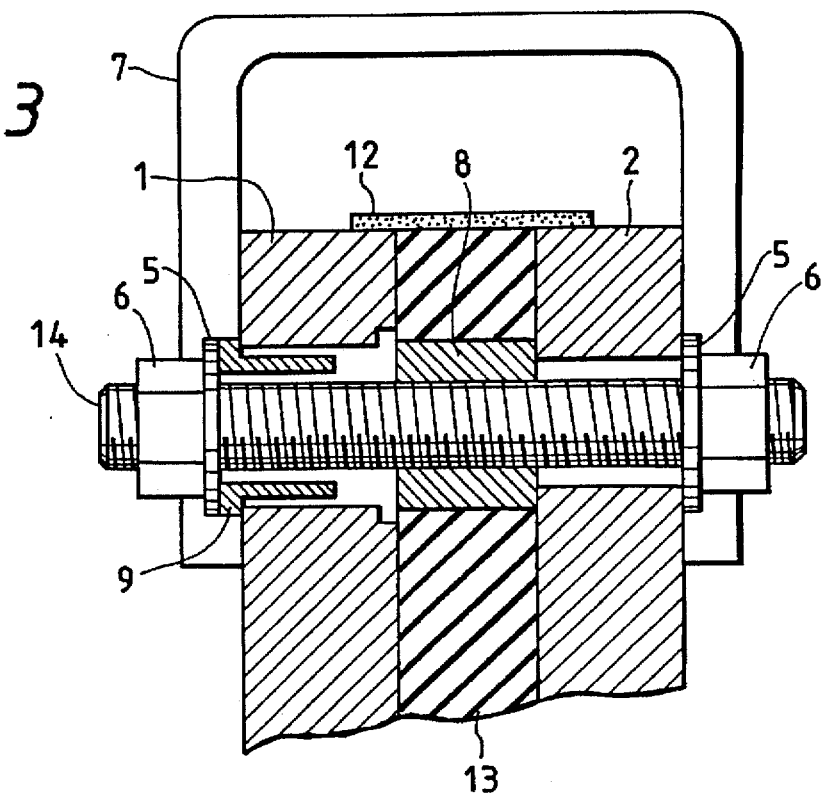
FIG. 3 shows still another embodiment of the present invention.
Figure 4:
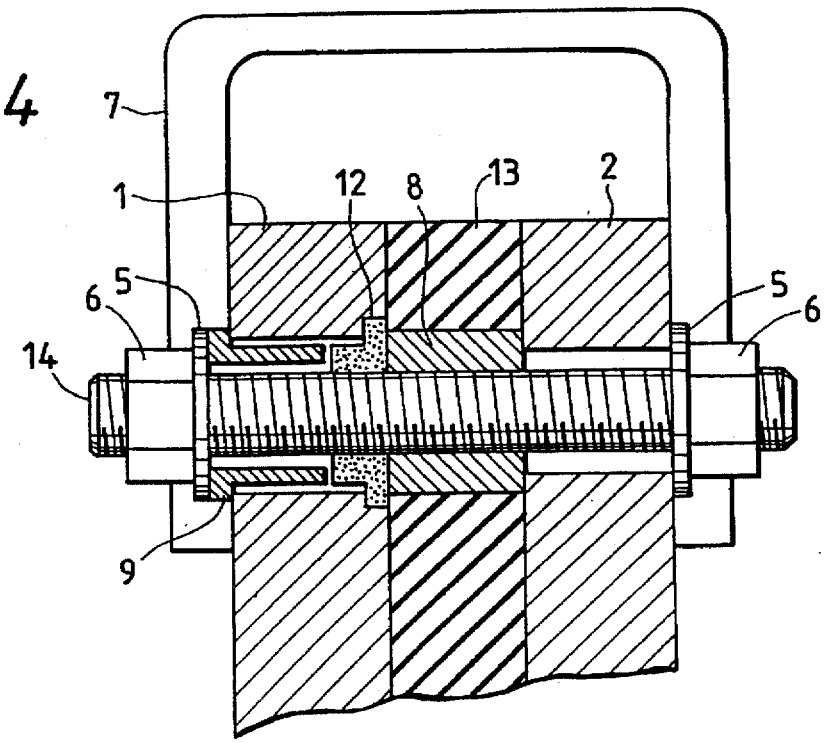
FIG. 4 shows still another embodiment of the present invention.

FIGS. 2 to 4 show other embodiments.

Figure 6:
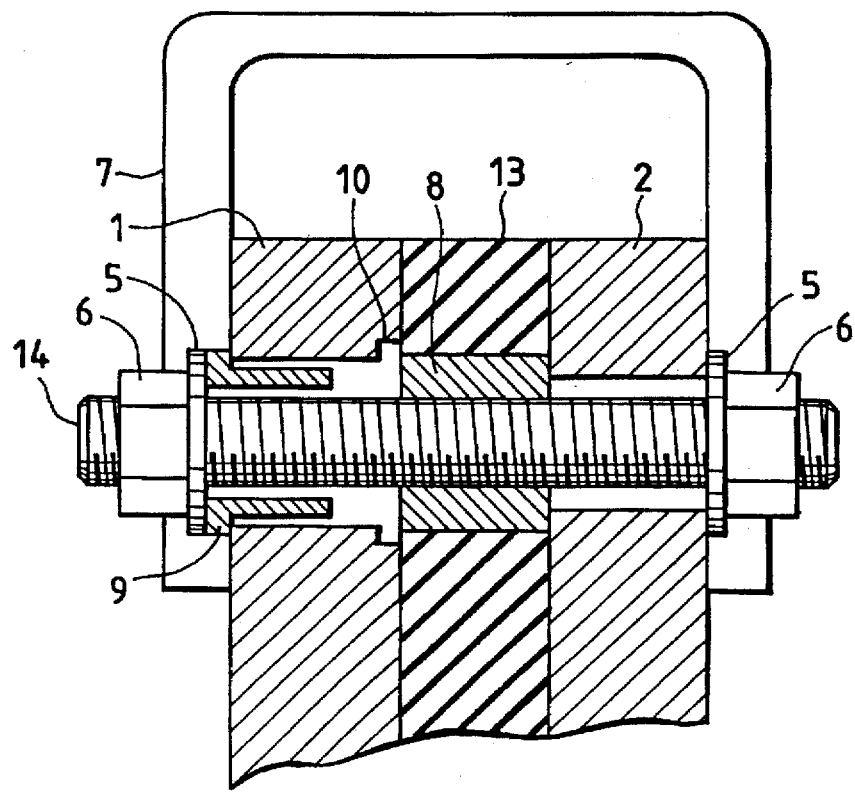
FIG. 6 shows details of a prior art insulated mounting section between tanks of a gas-insulated switchgear.
Figure 7:
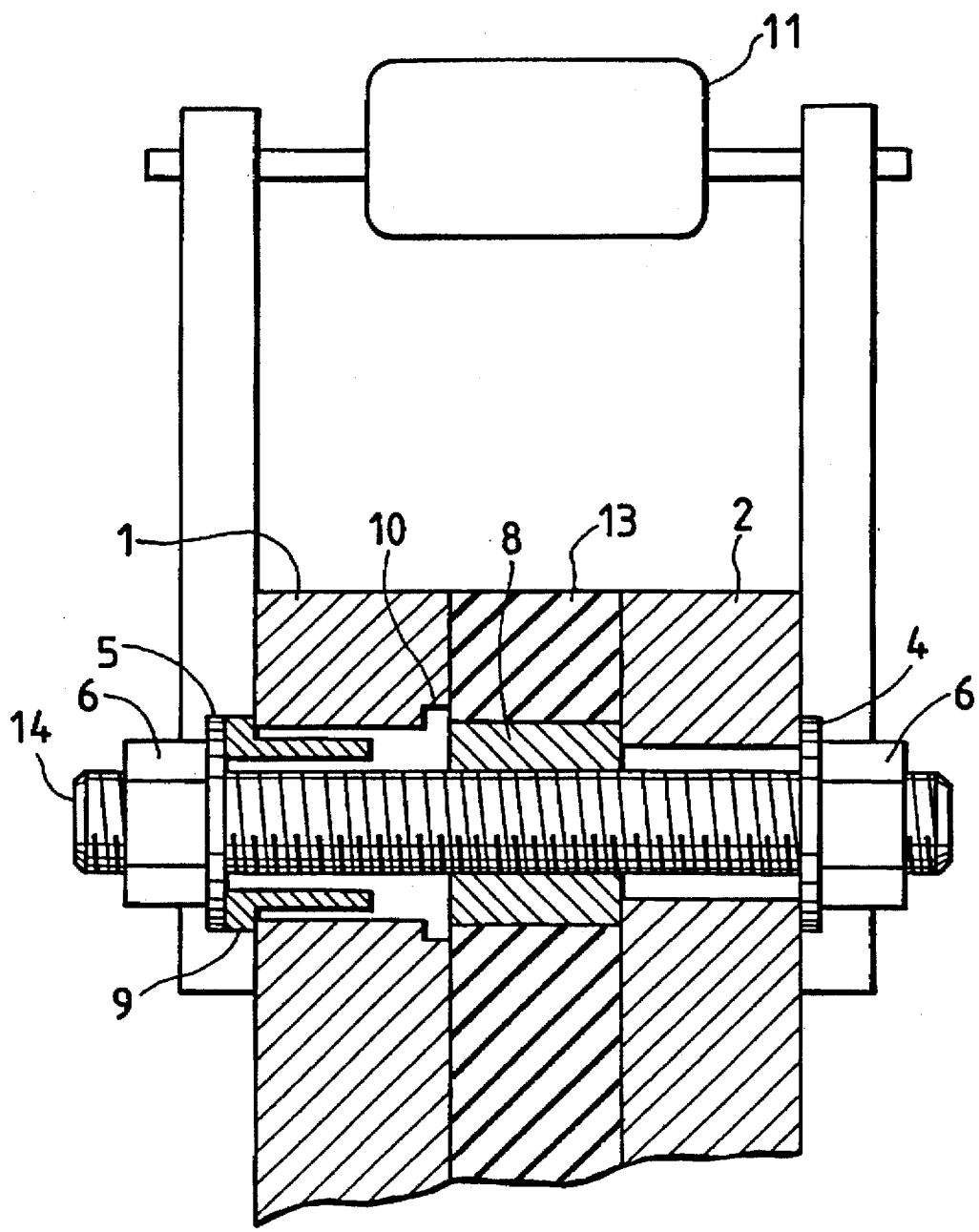
FIG. 7 shows a prior art joint between tanks using a zinc oxide device.

FIG. 2 shows an embodiment in which the existing insulating washer 9 in FIG. 6 is replaced with a conductive material 12 of high resistivity. Also thereby, the same advantage as the embodiment in FIG. 1 is obtained.

Figure 5:
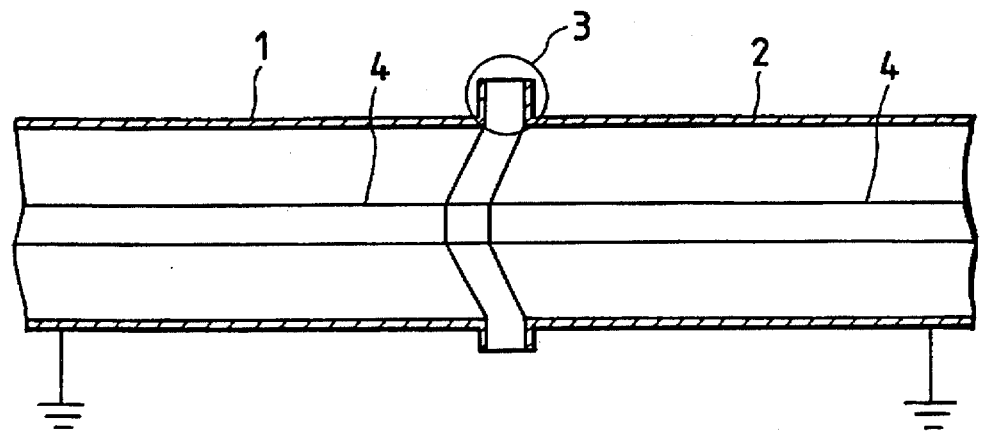
FIG. 5 shows a prior art joint between tanks of a gas-insulated switchgear.

FIG. 3 shows an embodiment in which the existing tanks 1 and 2 in FIG. 5 are electrically connected by the conductive material 12. Also thereby, the same advantage as the embodiment in FIG. 1 is obtained.

FIG. 4 shows an embodiment in which the tank 1 is connected electrically with the metallic section 8 by the conductive material 12 placed in the existing insulating gap 10 shown in FIG. 1. Also thereby, the same advantage as the embodiment in FIG. 1 is obtained.

The present invention has the advantages that the reliability is improved because no steep surge is theoretically induced in an insulated section, the structure is simplified, the number of parts is decreased, and the profitability is improved.

What is claimed is:

1. An insulating joint between two tanks of a gas insulated switchgear, the tanks being electrically connected by a first conductor member and having a main circuit conductor extending therethrough, said insulating joint comprising:

an insulating member positioned between adjacent ends of said tanks, and a second conductor member electrically connecting said tanks and having a resistivity higher than that of said first conductor member.

2. An insulating joint according to claim 1, which further includes a conductive bolt extending through said ends of said tanks and said insulating member, said bolt having a conductive nut and a conductive washer attached adjacent one end thereof and wherein said second conductor member electrically connects said washer and one of said tanks.

3. An insulating joint according to claim 1, wherein said second conductor member directly electrically connects said ends of said tanks across said insulating material.

4. An insulating joint according to claim 1, wherein one end of one of said tanks has an insulating gap therethrough, said bolt extends through said gap and said second conductor member is placed in said gap to electrically connect said bolt and said one end of said tank.

* * * * *